United States Patent
Hisada et al.

(10) Patent No.: US 6,190,557 B1
(45) Date of Patent: Feb. 20, 2001

(54) SPIRAL WOUND TYPE MEMBRANE ELEMENT, RUNNING METHOD AND WASHING METHOD THEREOF

(75) Inventors: Hajimu Hisada; Yuji Nishida, both of Ibaraki (JP)

(73) Assignee: Nitto Denko Corporation, Osaka (JP)

( * ) Notice: Under 35 U.S.C. 154(b), the term of this patent shall be extended for 0 days.

(21) Appl. No.: 08/986,554

(22) Filed: Dec. 8, 1997

(30) Foreign Application Priority Data

Dec. 9, 1996 (JP) .................................................... 8-328698
Feb. 19, 1997 (JP) .................................................... 9-035188

(51) Int. Cl.⁷ .................................................... B01D 61/08
(52) U.S. Cl. .............. 210/650; 210/321.76; 210/321.77; 210/321.85; 210/321.86; 210/407; 210/411; 210/437; 210/439; 210/448; 210/457; 210/487; 210/493.1; 210/497.01; 210/772
(58) Field of Search ..................................... 210/650, 799, 210/407, 437, 448, 452, 493.1, 487, 411, 772, 321.77, 457, 321.76, 321.85, 439, 497.01, 321.86

(56) References Cited

U.S. PATENT DOCUMENTS

| 3,813,334 | * | 5/1974 | Bray . |
| 3,933,646 | * | 1/1976 | Kanamaru et al. . |
| 4,668,384 | * | 5/1987 | Holman . |
| 4,834,881 |   | 5/1989 | Sawada et al. . |
| 4,872,990 | * | 10/1989 | Van Wijk . |
| 5,290,446 | * | 3/1994 | Degen et al. . |

FOREIGN PATENT DOCUMENTS

| 56-28568 | 7/1981 | (JP) . |
| 59-162905 | 9/1984 | (JP) . |
| 64-47404 | 2/1989 | (JP) . |
| 64-51105 | 2/1989 | (JP) . |
| 8-141375 | 6/1996 | (JP) . |
| 8-196878 | 8/1996 | (JP) . |

* cited by examiner

Primary Examiner—W. L. Walker
Assistant Examiner—Michael A. Fleming
(74) Attorney, Agent, or Firm—Akin, Gump, Strauss, Hauer & Feld, L.L.P.

(57) ABSTRACT

A spiral wound type membrane element is formed by winding independent or continuous envelope-like membranes around the peripheral surface of a water collection pipe and interposing raw water spacers between the envelope-like membranes. When running, raw water is supplied from at least the periphery side of the spiral wound type membrane element and permeate is taken out from an opening end of the water collection pipe. In back wash reverse filtration, permeate is introduced from the opening end of the water collection pipe and permeate guided out from the peripheral surface of the water collection pipe is discharged from at least the periphery side of the spiral wound type membrane element.

29 Claims, 10 Drawing Sheets

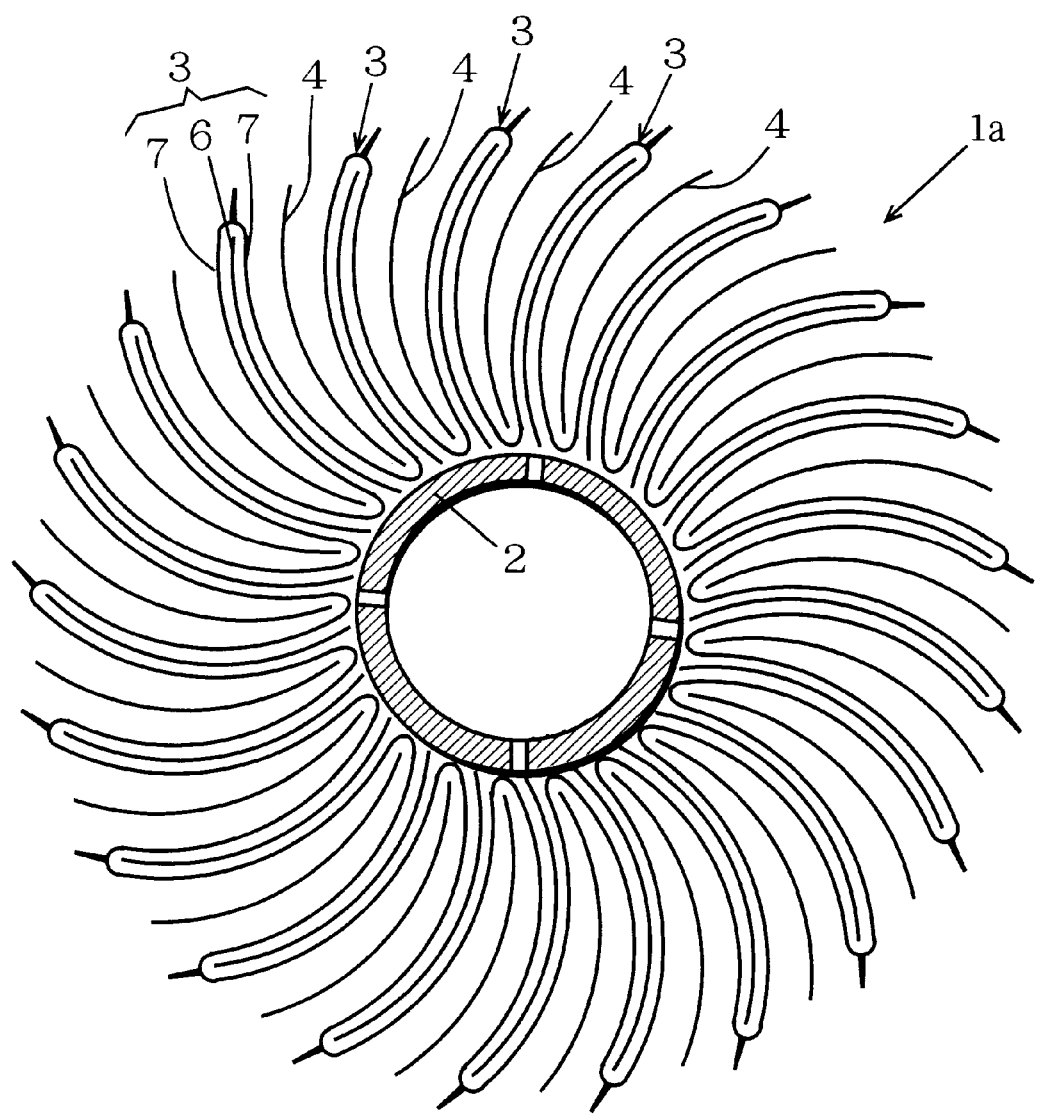
F I G. 2

SPIRAL WOUND TYPE MEMBRANE ELEMENT, RUNNING METHOD AND WASHING METHOD THEREOF

BACKGROUND OF THE INVENTION

1. Field of the Invention

The present invention relates to a spiral wound type membrane element used in a membrane separation device such as a low-pressure reverse osmosis membrane separation device, an ultrafiltration device or a microfiltration device, and a method for running the same and a method for washing the same.

2. Description of the Background Art

With the recent trend toward applications of membrane separation technology to water-purification technology, the membrane separation technology is being applied as pretreatment for reverse osmosis membrane separation systems used to turn salt water into fresh water, for example. While microfiltration membranes and ultrafiltration membranes which provide large permeate flow rates are mainly used for such membrane separation, reverse osmosis membranes providing large permeate flow rates at ultra-low pressures of 10 $kgf/cm^2$ or lower are being developed these days.

As for membrane elements used for this kind of membrane separation, hollow fiber membrane elements are often used in view of membrane area per unit volume (volumetric efficiency). However, the hollow fiber membrane elements have the disadvantage that the membranes are easily broken. If the membrane is broken, raw water is mixed into permeate to lower the separating performance.

As for membrane elements providing large membrane area, there are spiral wound type membrane elements. As compared with the hollow fiber membrane elements, the spiral wound type membrane elements are more advantageous in that they can maintain high separating performance and thus provides higher reliability.

FIG. 8 is a partially cutaway perspective view of a conventional spiral wound type membrane element and FIG. 9 is an external perspective view of the conventional spiral wound type membrane element.

As shown in FIG. 8, the spiral wound type membrane element 21 includes an envelope-like membrane (a bag-like membrane) 23 formed by putting separation membranes 26 on both sides of a permeate spacer 25 and bonding them together on three sides. The opening of the envelope-like membrane 23 is attached to a water collection pipe 22 formed of a perforated hollow pipe, and it is spirally wound around the water collection pipe 22 together with a net-like raw water spacer 24.

The raw water spacer 24 is provided to form a passage through which the raw water passes between the envelope-like membrane 23. If the thickness of the raw water spacer 24 is small, the separation membranes 26 can be efficiently accommodated but they will suffer from clogging with suspended substances. Accordingly, usually, the thickness of the raw water spacer 24 is set to about 0.7 to 3.0 mm.

A spiral wound type membrane element using a corrugating type raw water spacer (a so-called corrugating spacer) is already known, which is formed in a zig-zag shape to treat raw water, e.g., river water, containing a large quantity of suspended substances.

As shown in FIG. 9, the peripheral surface of the spiral wound type membrane element 21 is covered by a sheath 27 formed of FRP (Fiber-Reinforced Plastics), a shrink tube, or the like, whose two ends are each equipped with a packing holder 28 called an anti-telescope.

FIG. 10 is a cross section showing an example of a method for running the conventional spiral wound type membrane element. As shown in FIG. 10, a pressure vessel (a pressure-resisting vessel) 30 is formed of a tubular case 31 and a pair of end plates 32a and 32b. One end plate 32a has an inlet 33 for raw water and the other plate 32b has an outlet 35 for concentrate. The other end plate 32b also has an outlet 34 for permeate in the center.

The spiral wound type membrane element 21, to which a packing 37 is attached on the peripheral surface in the vicinity of one end, is accommodated in the tubular case 31 and both of the opening ends of the tubular case 31 are sealed with the end plates 32a and 32b. One opening end of the water collection pipe 22 is engaged with the permeate outlet 34 in the end plate 32b, and an end cap 36 is attached to the other opening end thereof.

When running the spiral wound type membrane element 21, raw water 51 is introduced from the raw water inlet 33 of the pressure vessel 30 into a first liquid chamber 38. As shown in FIG. 8, the raw water 51 is supplied from one end of the spiral wound type membrane element 21. The raw water 51 flows in the axial direction along the raw water spacer 24 and is discharged as concentrate 53 from the other end of the spiral wound type membrane element 21. The raw water 51 passed through the separation membranes 26 while flowing along the raw water spacer 24 flows into the water collection pipe 22 as permeate 52 along the permeate spacer 25 and is discharged from the end of the water collection pipe 22.

The permeate 52 is taken out from the permeate outlet 34 of the pressure vessel 30 shown in FIG. 10. The concentrate 53 is taken out through the concentrate outlet 35 from a second liquid chamber 39 in the pressure vessel 30.

When the membrane element is operated, the membrane is clogged with suspended substances in the raw water, which reduces the flux of permeate. Then the clogging substances are removed by chemical washing to recover the flux of permeate, which raises the problem that the chemical washing requires troublesome work and cost. Accordingly, with a hollow fiber membrane element, for example, it is periodically cleaned by back wash reverse filtration with permeate or air to prevent clogging. However, applying back wash reverse filtration to the conventional spiral wound type membrane element 21 causes the following problems.

FIG. 11 is a partially cutaway perspective view showing back wash reverse filtration operation with the conventional spiral wound type membrane element. As shown in FIG. 11, permeate 52 is introduced from an end of the water collection pipe 22. Since the peripheral surface of the envelope-like membrane 23 wound around the water collection pipe 22 is covered with the sheath 27, the permeate guided out from the peripheral surface of the water collection pipe 22 permeates through the envelope-like membrane 23 to flow in the axial direction inside the membrane element 21 along the raw water spacer 24 and is discharged from the end of the membrane element 21. Hence, contaminants such as suspended substances causing clogging are likely to be caught by the raw water spacer 24 before discharged to the end of the membrane element 21, causing the problem that they are not sufficiently removed.

Furthermore, as shown in FIG. 10, the gap between the inner peripheral surface of the tubular case 31 of the pressure vessel 30 and the spiral wound type membrane element 21 forms a dead space S, which causes the fluid to stay (fluid stay). When the spiral wound type membrane element 21 is used in a long time, the fluid staying in the dead space deteriorates. Especially, if the fluid contains organic matter, various germs such as microorganisms propagate and decompose the organic matter to produce a bad smell, or may decompose the separation membranes, leading to reduction in reliability.

Moreover, since the raw water is supplied from one end of the spiral wound type membrane element 21 and is discharged from the other end, the conventional spiral wound type membrane element 21 requires the packing holders 28 to prevent the envelope-like membrane 23 wound around the water collection pipe 22 from being transformed into a shape like bamboo shoots. Further, pressure loss due to the raw water spacer 24 and pressure loss due to clogging produce a difference in pressure between the inflow of raw water and the outflow of concentrate, which deforms the spiral wound type membrane element 21. In order to prevent deformation, the peripheral surface of the envelope-like membrane 23 wound around the water collection pipe 22 is covered with the sheath 27 formed of FRP, a shrink tube, or the like. This increases the parts cost and production cost.

Further, it is necessary to obtain sufficient linear velocity along the membrane surface to prevent formation of cake with contaminants in the raw water, which requires sufficient flow rate of concentrate. Increasing the flow rate of concentrate lowers recovery per membrane element and requires use of a large pump to supply the raw water, which largely increases the system cost.

SUMMARY OF THE INVENTION

An object of the present invention is to provide a spiral wound type membrane element capable of reducing costs, easy to wash, and providing high reliability and a method for running the same.

Another object of the present invention is to provide a washing method which can easily and certainly remove contaminants caught by the spiral wound type membrane element.

According to the present invention, a spiral wound type membrane element includes a spiral membrane component, and the spiral membrane component includes a perforated hollow pipe, a plurality of independent or continuous envelope-like membranes wound around the peripheral surface of the perforated hollow pipe, and raw liquid passage forming members interposed between the plurality of envelope-like membranes, wherein raw liquid is supplied from the peripheral side and both end sides of the spiral membrane component and permeate is guided out from at least one opening end of the perforated hollow pipe.

In the spiral wound type membrane element, the peripheral surface and both ends of the spiral membrane component are not covered with a sheath but are opened. Accordingly, raw liquid can be supplied from the periphery and both ends of the membrane element to perform dead end filtration.

Since raw liquid is thus supplied from the peripheral side and both ends of the membrane element, contaminants are caught at the periphery and both ends of the membrane element. This enables uniform removal of contaminants with back wash reverse filtration using permeate, for example.

According to the structure of the invention, no dead space is formed in the gap between the membrane element and the pressure vessel since dead end filtration is performed. This prevents the fluid from staying in the gap between the membrane element and the pressure vessel. Therefore, even if it is used for separation of fluid containing organic matter, no problem is caused by propagation of various germs such as microorganisms, generation of a bad smell due to decomposition of organic matter, decomposition of the separation membranes, etc., thus providing high reliability.

Furthermore, since raw liquid is supplied from the periphery and both ends of the membrane element, pressures are applied to the membrane element from all directions. Since such pressure as may cause deformation in the axial direction is not applied, the envelope-like membranes wound around the perforated hollow pipe are not deformed into a shape like bamboo shoots. This eliminates the necessity of using packing holders and a sheath, thus reducing the parts cost and production cost. The dead end filtration provides high recovery without the necessity of using a large pump to supply raw liquid. This reduces the system cost.

Moreover, since pressures are applied to the membrane element from all directions, the membrane element is not deformed even if the raw liquid is supplied at high pressure. This provides good pressure resistance.

According to another aspect of the present invention, a spiral wound type membrane element includes a spiral membrane component, and the spiral membrane component includes a perforated hollow pipe, a plurality of independent or continuous envelope-like membranes wound around the peripheral surface of the perforated hollow pipe, and raw liquid passage forming members interposed between the plurality of envelope-like membranes, wherein the spiral membrane component is sealed at its one end, and raw liquid is supplied from the peripheral side and the other end side of the spiral membrane component and permeate is guided out from at least one opening end of the perforated hollow pipe.

In the spiral wound type membrane element, the peripheral surface and one end of the spiral membrane component are not covered with a sheath but are opened. Accordingly, raw liquid can be supplied from the periphery and one end of the membrane element to perform dead end filtration.

Since raw liquid is thus supplied from the peripheral side and one end side of the membrane element, contaminants are caught on the periphery and the one end of the membrane element. This enables uniform removal of the contaminants in back wash reverse filtration with, e.g., permeate.

Particularly, since no space is required for supply of raw liquid on the sealed end side of the membrane element, it is possible to reduce the size of the pressure vessel for accommodating the membrane element. It is also possible, by positioning the sealed end of the membrane element on the raw liquid inlet side in the pressure vessel, to prevent adhesion of dirt on the end of the spiral membrane component due to dynamic pressure of raw liquid when raw liquid is introduced.

According to the structure of the invention, as well, no dead space is formed in the gap between the membrane element and the pressure vessel since dead end filtration is performed. Hence, no problem is encountered due to propagation of various germs such as microorganisms, generation of a bad smell caused by decomposition of organic matter, decomposition of the separation membranes, etc., thus providing high reliability.

Furthermore, since pressures are applied to the membrane element from all directions, without application of such pressure as may cause deformation in the axial direction, the envelope-like membranes wound around the perforated hollow pipe are not deformed into a shape like bamboo shoots. This eliminates the necessity of using packing holders and a sheath, thus reducing the parts cost and production cost. The dead end filtration provides excellent recovery without the necessity of using a large pump to supply raw liquid. This reduces the system cost.

Moreover, since pressures are applied to the membrane element from all directions, the membrane element is not deformed even if the pressure for supply of raw liquid is high. This provides good pressure resistance.

According to still another aspect of the present invention, a spiral wound type membrane element includes a spiral membrane component, and the spiral membrane component includes a perforated hollow pipe, a plurality of independent or continuous envelope-like membranes wound around the peripheral surface of the perforated hollow pipe, and raw liquid passage forming members interposed between the plurality of envelope-like membranes, wherein the spiral membrane component is sealed on both ends, and raw liquid is supplied from the peripheral side of the spiral membrane component and permeate is guided out from at least one opening end of the perforated hollow pipe.

In the spiral wound type membrane element, the peripheral surface of the spiral membrane component is not covered with a sheath but is opened. Accordingly, raw liquid can be supplied from the peripheral side of the membrane element to perform dead end filtration.

Since raw liquid is thus supplied from the periphery of the membrane element, contaminants are caught on the periphery of the membrane element. Then the contaminants can be uniformly removed by back wash reverse filtration using permeate, for example.

Particularly, since no space is required for supply of raw liquid at the sealed ends of the membrane element, the pressure vessel for accommodating the membrane element can be reduced in size. Further, it is possible, by positioning one of the sealed ends of the membrane element on the raw liquid inlet side in the pressure vessel, to prevent dirt from attaching to the end of the spiral membrane component due to dynamic pressure of raw liquid when raw liquid is introduced.

According to the structure of the invention, too, no dead space is formed in the gap between the membrane element and the pressure vessel since dead end filtration is performed. Hence, no problem is encountered due to propagation of various germs such as microorganisms, generation of a bad smell caused by decomposition of organic matter, decomposition of the separation membranes, etc., thus providing high reliability.

Furthermore, since pressures are applied to the membrane element from all directions, instead of such application of pressure as may cause deformation in the axial direction, the envelope-like membranes wound around the perforated hollow pipe are not deformed into a shape like bamboo shoots. This eliminates the necessity of using packing holders and a sheath, thus reducing the parts cost and production cost. The dead end filtration eliminates the necessity of using a large pump to supply raw liquid while providing high recovery. This reduces the system cost.

Moreover, since pressures are applied to the membrane element in all directions, the membrane element is not deformed even if the pressure for supply of raw liquid is high. This provides good pressure resistance.

With the above-described spiral wound type membrane element, it is preferred that the periphery of the spiral membrane component is covered with a peripheral passage forming member. With a conventional spiral wound type membrane element, contaminants are caught at the raw water spacer before discharged from one end of the membrane element in back wash reverse filtration with permeate or the like. In contrast, with the spiral wound type membrane element of the present invention performing filtration with the above-described structure, the contaminants are caught on at least the periphery of the membrane element and easily come off from the separation membranes in back wash reverse filtration. If the periphery of the spiral membrane component is covered with a peripheral passage forming member, a space is ensured between the membrane element and the pressure vessel. As a result, it is possible to easily discharge the contaminants coming off from at least the periphery of the membrane element out of the system through the space.

It is preferred that the peripheral passage forming member has a thickness of not less than 0.6 mm nor more than 30 mm. It is then possible in back wash reverse filtration to discharge contaminants attached to at least the periphery of the membrane element out of the system while maintaining large volumetric efficiency of the membrane element with respect to the pressure vessel.

It is preferred that the raw liquid passage forming members have a thickness of not less than 0.1 mm nor more than 0.5 mm. Then it is possible to obtain a high accommodation efficiency of the separation membranes while ensuring a passage for raw liquid and to catch contaminants at at least the periphery of the membrane element. Then the contaminants can be removed easily by back wash reverse filtration operation by using permeate or the like.

Each of the plurality of envelope-like membranes may include two separation membranes and a permeate passage forming member interposed between the two separation membranes, in which the two separation membranes are bonded together on three sides and the opening of the envelope-like membrane is attached to the peripheral surface of the perforated hollow pipe. The envelope-like membrane is preferably formed of a low-pressure reverse osmosis membrane, an ultrafiltration membrane or a microfiltration membrane.

The peripheral passage forming member may be formed of a net of plastic, metal, rubber, or fiber.

The spiral wound type membrane element may further include a pressure vessel in which the spiral membrane component is accommodated.

A further aspect of the present invention is directed to a method(A) for running a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, and the running method includes the steps of supplying raw liquid from the peripheral side and both end sides of the spiral wound type membrane element and taking out permeate from at least one opening end of the perforated hollow pipe.

According to the spiral wound type membrane element running method(A), contaminants are caught on the periphery and both ends of the membrane element, which enables uniform removal of contaminants in back wash reverse filtration with permeate or the like. Further, filtration is performed in such a manner that no dead space is formed around the periphery of the membrane element, which prevents propagation of various germs such as microorganisms, generation of a bad smell due to decomposition of organic matter, and decomposition of the separation membranes, thus providing high reliability.

Further, pressures are applied to the membrane element from all directions, which eliminates the problem of deformation of the membrane element and eliminates the necessity of using packing holders and a sheath. Moreover, the dead end filtration eliminates the necessity of using a large pump to supply raw liquid. This reduces the costs.

A further aspect of the present invention is directed to a method(A) for running a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, wherein the spiral wound type membrane element has its one end sealed, and the running method includes the steps of supplying raw liquid from the peripheral side and the other end side of the spiral wound type membrane element and taking out permeate from at least one opening end of the perforated hollow pipe.

According to the spiral wound type membrane element running method(A), contaminants are caught at the periphery and one end of the membrane element, which enables uniform removal of contaminants in back wash reverse filtration with permeate or the like.

Particularly, since no space is required for supply of raw liquid on the sealed end side of the membrane element, a small-sized pressure vessel can be used. When the sealed end of the membrane element is positioned on the raw liquid inlet side in the pressure vessel, it is possible to prevent dirt from attaching to the end of the membrane element due to dynamic pressure of raw liquid when raw liquid is introduced.

Further, dead end filtration forms no dead space around the periphery of the membrane element, thus preventing propagation of various germs such as microorganisms, generation of a bad smell due to decomposition of organic matter, decomposition of the separation membranes, and providing high reliability.

Further, pressures are applied to the membrane element from all directions, which eliminates the problem of deformation of the membrane element and eliminates the necessity of using packing holders and a sheath. Moreover, the dead end filtration eliminates the necessity of using a large pump to supply raw liquid. This reduces the costs.

A further aspect of the present invention is directed to a method(A) for running a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, wherein the spiral wound type membrane element has both its ends sealed, and the running method includes the steps of supplying raw liquid from the peripheral side of the spiral wound type membrane element and taking out permeate from at least one opening end of the perforated hollow pipe.

According to the spiral wound type membrane element running method(A), contaminants are caught on the periphery of the membrane element, which enables uniform removal of contaminants in back wash reverse filtration with permeate or the like.

Particularly, since no space is required for supply of raw liquid at both ends of the membrane element, a small-sized pressure vessel can be used. When one of the sealed ends of the membrane element is positioned on the raw liquid inlet side of the pressure vessel, it is possible to prevent dirt from attaching to the end of the membrane element due to dynamic pressure of the raw liquid when raw liquid is introduced.

Further, dead end filtration forms no dead space around the periphery of the membrane element, thus preventing problems caused by propagation of various germs such as microorganisms, generation of a bad smell due to decomposition of organic matter, decomposition of the separation membrane, and providing high reliability.

Further, pressures are applied to the membrane element from all directions, which eliminates the problem of deformation of the membrane element and eliminates the necessity of using packing holders and a sheath. Moreover, the dead end filtration eliminates the necessity of using a large pump to supply raw liquid. This reduces the costs.

Still another aspect of the present invention is directed to a method for washing a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, and the washing method includes the steps of introducing a washing liquid from at least one opening end of the perforated hollow pipe, and discharging the washing liquid guided out from the peripheral surface of the perforated hollow pipe from the periphery and both ends of the spiral wound type membrane element.

Since the peripheral surface and both ends of the above-described spiral wound type membrane element are not covered with a sheath but are opened, it is possible to supply raw liquid from the peripheral side and both end sides of the membrane element to perform dead end filtration. In this case, contaminants are caught on the periphery and both ends of the membrane element.

When washing, a washing liquid introduced from at least one opening end of the perforated hollow pipe is guided out from the peripheral surface of the perforated hollow pipe and passes through the envelope-like membranes to flow along the raw liquid passage forming members, and is discharged from the periphery and both ends of the spiral wound type membrane element. Then contaminants caught on the periphery and both ends of the membrane element come off from the membrane element and are discharged out of the system with the washing liquid. The contaminants caught on the periphery and both ends of the membrane element can thus be uniformly removed.

A further aspect of the present invention is directed to a method for washing a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, the spiral wound type membrane element having its one end sealed, and the washing method includes the steps of introducing a washing liquid from at least one opening end of the perforated hollow pipe, and discharging the washing liquid guided out from the peripheral surface of the perforated hollow pipe from the periphery and the other end of the spiral wound type membrane element.

Since the peripheral surface and one end of the above-described spiral wound type membrane element are not covered with a sheath but are opened, it is possible to supply raw liquid from the peripheral side and one end side of the membrane element to perform dead end filtration. In this case, contaminants are caught at the periphery and one end of the membrane element.

When washing, a washing liquid introduced from at least one opening end of the perforated hollow pipe is guided out from the peripheral surface of the perforated hollow pipe and passes through the envelope-like membranes to flow along the raw liquid passage forming members, and is discharged from the periphery and one end of the spiral wound type membrane element. Then contaminants caught at the periphery and one end of the membrane element come off from the membrane element and are discharged out of the system with the washing liquid. The contaminants caught at the periphery and one end of the membrane element can thus be uniformly removed.

A further aspect of the present invention is directed to a method for washing a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, the spiral wound type membrane element having both its ends sealed, and the washing method includes the steps of introducing a washing liquid from at least one opening end of the perforated hollow pipe, and discharging the washing liquid guided out from the peripheral surface of the perforated hollow pipe from the periphery of the spiral wound type membrane element.

Since the peripheral surface of the above-described spiral wound type membrane element is not covered with a sheath but is opened, it is possible to supply raw liquid from the periphery of the membrane element to perform dead end filtration. In this case, contaminants are caught on the periphery of the membrane element.

When washing, a washing liquid introduced from at least one opening end of the perforated hollow pipe is guided out from the peripheral surface of the perforated hollow pipe and passes through the envelope-like membranes to flow along the raw liquid passage forming members, and is discharged from the periphery of the membrane element. Then contaminants caught on the periphery of the membrane element come off from the membrane element and are discharged out of the system with the washing liquid. The contaminants caught on the periphery of the membrane element can thus be uniformly removed.

In the spiral wound type membrane element washing method, it is preferable to cause raw liquid to flow in the axial direction along the periphery of the spiral wound type membrane element. Then it is possible to easily make the contaminants attached to the periphery of the membrane element come off and to easily and certainly discharge the contaminants coming off from the membrane element from the system.

In the above-described spiral wound type membrane element washing method, permeate may be used as the washing liquid.

Still another aspect of the present invention is directed to a method(B) for running a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, and the running method includes the steps of, when running, supplying raw liquid from the peripheral side and both end sides of the spiral wound type membrane element and taking out permeate from at least one opening end of the perforated hollow pipe, and when washing, introducing permeate from at least one opening end of the perforated hollow pipe and discharging the permeate guided out from the peripheral surface of the perforated hollow pipe from the periphery and both ends of the spiral wound type membrane element.

According to the spiral wound type membrane element running method(B), when running, raw liquid is supplied from the periphery and both ends of the membrane element and dead end filtration is performed. In this case, contaminants are caught at the periphery and both ends of the membrane element.

When washing, permeate introduced from at least one opening end of the perforated hollow pipe is guided out from the peripheral surface of the perforated hollow pipe and passes through the envelope-like membranes to flow along the raw liquid passage forming members, and is discharged from the periphery and both ends of the membrane element. Then contaminants caught at the periphery and both ends of the membrane element come off from the membrane element and are discharged out of the system with the permeate. The contaminants caught at the periphery and both ends of the membrane element can thus be uniformly removed, and then stable permeate flow rate is always maintained while running.

Since no dead space S is formed in the gap between the membrane element and the pressure vessel since dead end filtration is performed, fluid does not stay in the gap between the membrane element and the pressure vessel. Therefore, even if it is used for separation of fluid containing organic matter, no problem is encountered due to propagation of various germs such as microorganisms, generation of a bad smell caused by decomposition of organic matter, decomposition of the separation membranes, etc., thus providing high reliability.

Furthermore, since raw liquid is supplied from the peripheral side and both end sides of the membrane element, pressures are applied to the membrane element from all directions, instead of such application of pressure as may cause deformation in the axial direction, and then the envelope-like membranes wound around the perforated hollow pipe are not deformed into a shape like bamboo shoots. This eliminates the necessity of using packing holders and a sheath, thus reducing the parts cost and production cost. The dead end filtration provides high recovery without the necessity of using a large pump to supply raw liquid. This reduces the system cost.

A further aspect of the present invention is directed to a method(B) for running a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, the spiral wound type membrane element having its one end sealed, and the running method includes the steps of, when running, supplying raw liquid from the peripheral side and the other end side of the spiral wound type membrane element and taking out permeate from at least one opening end of the perforated hollow pipe, and when washing, introducing permeate from at least one opening end of the perforated hollow pipe and discharging the permeate guided out from the peripheral surface of the perforated hollow pipe from the periphery and the other end of the spiral wound type membrane element.

According to the spiral wound type membrane element running method(B), when running, raw liquid is supplied from the periphery and one end of the membrane element and dead end filtration is performed. In this case, contaminants are caught on the periphery and one end of the membrane element.

When washing, permeate introduced from at least one opening end of the perforated hollow pipe is guided out from the peripheral surface of the perforated hollow pipe and passes through the envelope-like membranes to flow along the raw liquid passage forming members, and is discharged from the periphery and one end of the membrane element. Then contaminants caught on the periphery and one end of the membrane element come off from the membrane element and are discharged out of the system with the permeate. The contaminants caught on the periphery and one end of the membrane element can thus be uniformly removed, thus enabling a stable permeate flow rate to be always maintained while running.

Particularly, since no space is required for supply of raw liquid on the sealed end side of the membrane element, a pressure vessel of a small size can be used. Further, when the sealed end of the membrane element is positioned on the raw liquid inlet side in the pressure vessel, it is possible to prevent adhesion of dirt at the end of the membrane element due to dynamic pressure of raw liquid when raw liquid is introduced.

No dead space S is formed around the membrane element since dead end filtration is performed, no problem is therefore caused by propagation of various germs such as microorganisms, generation of a bad smell due to decomposition of organic matter, decomposition of the separation membranes, etc., thus providing high reliability.

Furthermore, since pressures are applied to the membrane element from all directions, the membrane element is not deformed, which eliminates the necessity of using packing holders and a sheath. Further, the dead end filtration eliminates the necessity of using a large pump to supply raw liquid. This reduces the costs.

A further aspect of the present invention is directed to a method(B) for running a spiral wound type membrane element having a perforated hollow pipe, a plurality of independent or continuous envelope-like membranes wound around the peripheral surface of the perforated hollow pipe, and raw liquid passage forming members interposed between the plurality of envelope-like membranes, the spiral wound type membrane element having both its ends sealed, and the running method includes the steps of, when running, supplying raw liquid from the peripheral side of the spiral wound type membrane element and taking out permeate from at least one opening end of the perforated hollow pipe, and when washing, introducing permeate from at least one opening end of the perforated hollow pipe and discharging the permeate guided out from the peripheral surface of the perforated hollow pipe from the periphery of the spiral wound type membrane element.

According to the spiral wound type membrane element running method(B), when running, raw liquid is supplied from the periphery of the membrane element and dead end filtration is performed. In this case, contaminants are caught on the periphery of the membrane element.

When washing, permeate introduced from at least one opening end of the perforated hollow pipe is guided out from the peripheral surface of the perforated hollow pipe and passes through the envelope-like membranes to flow along the raw liquid passage forming members, and is discharged from the periphery of the membrane element. Then contaminants caught at the periphery of the membrane element come off and are discharged out of the system with the permeate. The contaminants caught at the periphery of the membrane element can thus be uniformly removed, thus always keeping a stable permeate flow rate while running.

Particularly, since no space is required for supply of raw liquid at both ends of the membrane element, a pressure vessel of a small size can be used. Further, when one of the sealed ends of the membrane element is positioned on the raw liquid inlet side in the pressure vessel, it is possible to prevent dirt from attaching to the end of the membrane element due to dynamic pressure of raw liquid when raw liquid is introduced.

No dead space S is formed around the membrane element since dead end filtration is performed, no problem is therefore encountered due to propagation of various germs such as microorganisms, generation of a bad smell caused by decomposition of organic matter, decomposition of the separation membranes, etc., thus providing high reliability.

Furthermore, since pressures are applied to the membrane element from all directions, the membrane element is not deformed, which eliminates the necessity of using packing holders and a sheath. Further, the dead end filtration eliminates the necessity of using a large pump to supply raw liquid. This reduces the costs.

In the above-described spiral wound type membrane element running method(B), it is preferable to cause raw liquid to flow in the axial direction along the periphery of the spiral wound type membrane element when washing. Then it is possible to easily make the contaminants attached on the periphery of the membrane element come off and to easily and certainly discharge the contaminants coming off the membrane element from the system.

These and other objects, features, aspects and advantages of the present invention will become apparent from the following detailed description of the present invention when taken in conjunction with the accompanying drawings.

BRIEF DESCRIPTION OF THE DRAWINGS

FIG. 2 is a transverse cross section showing an example of the envelope-like membranes of the spiral wound type membrane element shown in FIG. 1.

DESCRIPTION OF THE PREFERRED EMBODIMENTS

Figure 1:
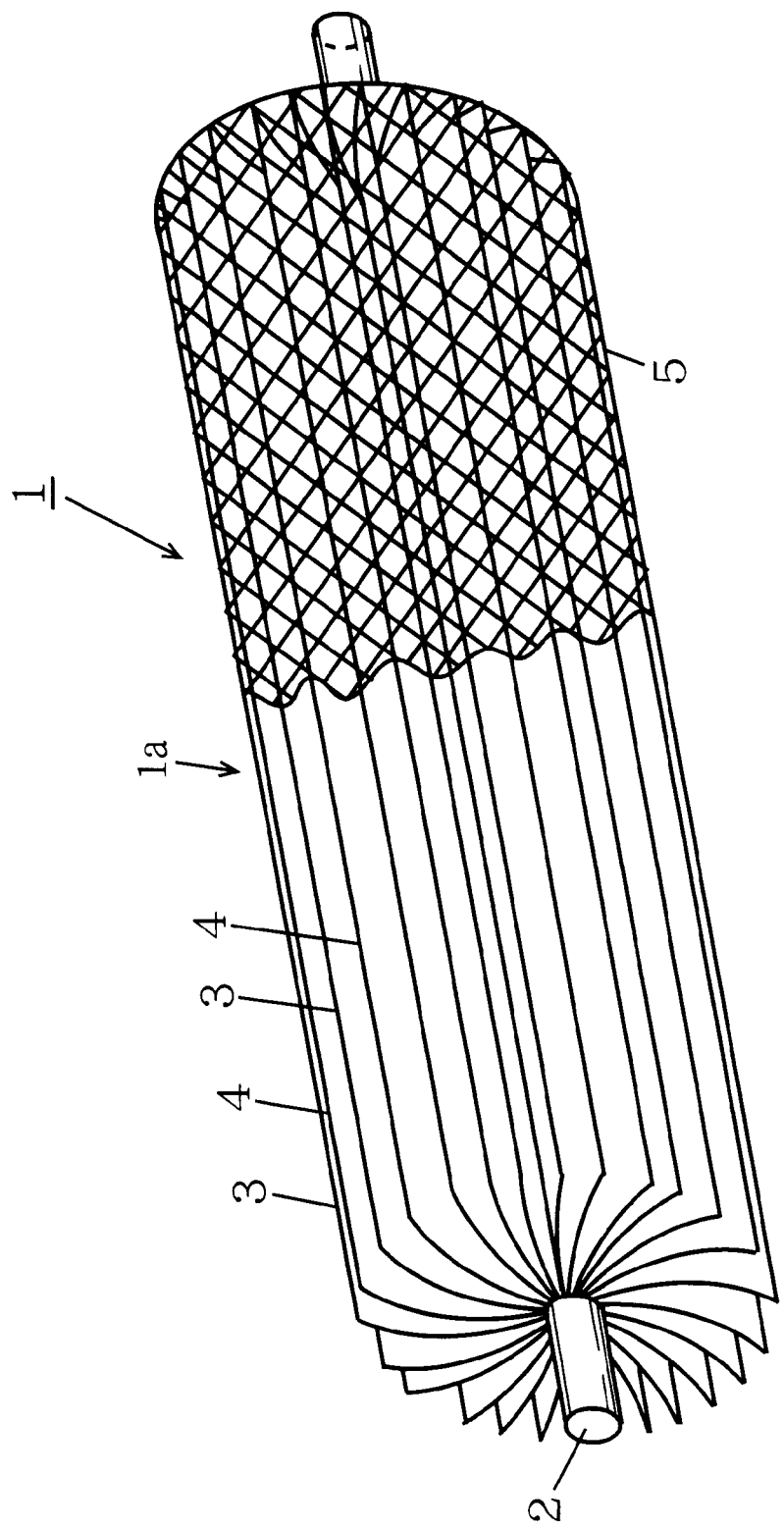
FIG. 1 is a partially cutaway perspective view showing a spiral wound type membrane element according to an embodiment of the present invention.

FIG. 1 is a partially cutaway perspective view showing a spiral wound type membrane element according to an embodiment of the present invention. FIG. 2 is a transverse cross section showing an example of the envelope-like membranes of the spiral wound type membrane element shown in FIG. 1 and FIG. 3 is a transverse cross section showing another example of the envelope-like membranes of the spiral wound type membrane element shown in FIG. 1.

The spiral wound type membrane element 1 shown in FIG. 1 includes a spiral membrane component 1a formed by winding a plurality of independent envelope-like membranes 3 or a plurality of continuous envelope-like membranes 3 around the external surface of a water collection pipe 2 formed of a perforated hollow pipe. Raw water spacers (raw water passage forming members) 4 are inserted between the envelope-like membranes 3 for the purpose of preventing the envelope-like membranes 3 from coming into contact with each other to reduce the membrane area and also for the purpose of forming a passage for raw water. The periphery of the spiral membrane component 1a is covered with a peripheral passage forming member 5 formed of a net of plastic, such as polypropylene, polyethylene, polystyrene, metal, rubber, fiber, etc.

Figure 3:
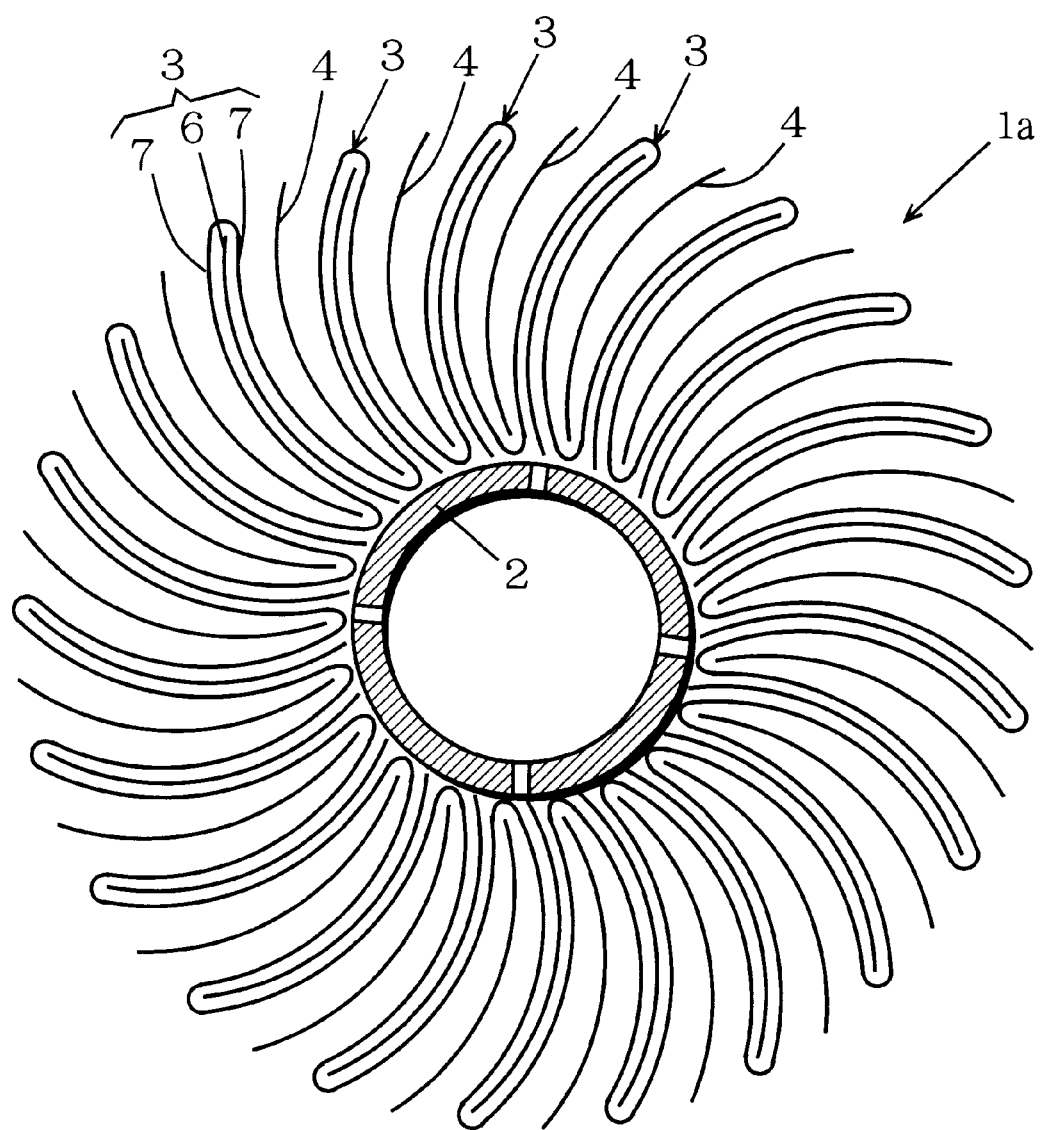
FIG. 3 is a transverse cross section showing another example of the envelope-like membranes of the spiral wound type membrane element of FIG. 1.

As shown in FIG. 2 and FIG. 3, each envelope-like membrane 3 is formed by putting two separation membranes 7 on both sides of a permeate spacer (a permeate passage forming member) 6 and bonding them together on three sides, whose opening part is attached to the peripheral surface of the water collection pipe 2. Low-pressure reverse osmosis membranes which are run at 10 kgf/cm² or lower, ultrafiltration membranes, or microfiltration membranes are used as the separation membranes 7.

In the example shown in FIG. 2, the plurality of envelope-like membranes 3 include independent separation membranes 7. In the example shown in FIG. 3, the plurality of envelope-like membranes 3 are formed by folding a continuous separation membrane 7.

If the thickness of the raw water spacers 4 is larger than 0.5 mm, it is difficult to catch contaminants in raw water at least at the periphery of the membrane element 1. If the raw water spacers 4 have a thickness smaller than 0.1 mm, the envelope-like membranes 3 are then likely to come into contact with each other, which reduces the membrane area. Accordingly, it is preferred that the raw water spacers 4 have a thickness of 0.1 mm or larger and 0.5 mm or smaller.

If the thickness of the peripheral passage forming member 5 is larger than 30 mm, the volumetric efficiency of the membrane element 1 with respect to the pressure vessel accommodating the membrane element 1 becomes small. If the thickness of the peripheral passage forming member 5 is smaller than 0.6 mm, the flow velocity of the raw water for discharging contaminants attached on at least the periphery of the membrane element 1 out of the system becomes small in back wash reverse filtration with permeate. Hence it is preferred that the peripheral passage forming member 5 has a thickness of 0.6 mm or larger and 30 mm or smaller.

Figure 4:
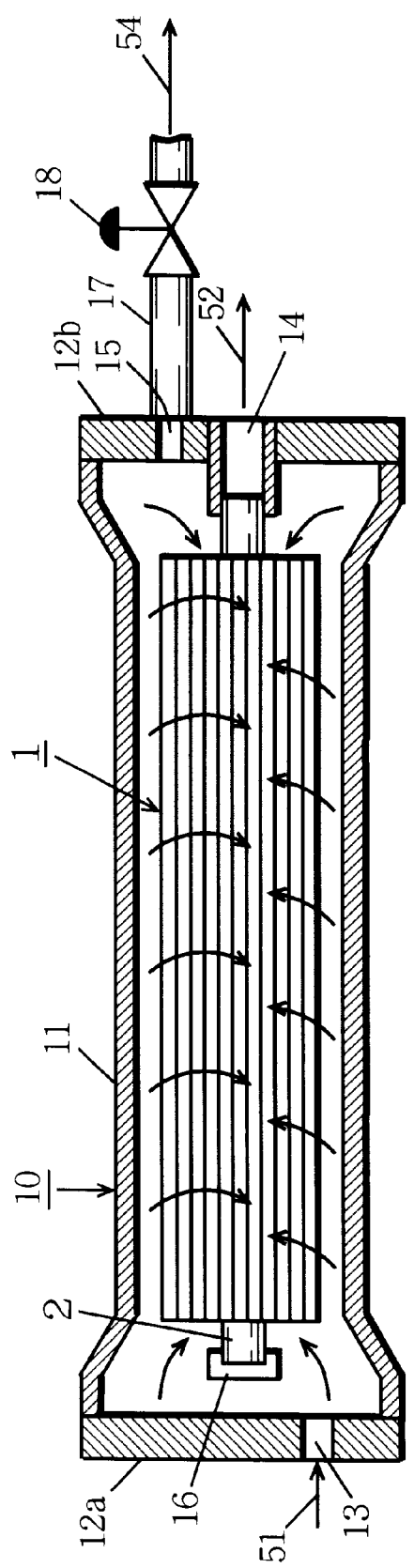
FIG. 4 is a cross section showing an example of a method of running the spiral wound type membrane element of FIG. 1.

FIG. 4 is a cross section showing an example of a method of running the spiral wound type membrane element of this preferred embodiment. As shown in FIG. 4, the pressure vessel (pressure-resisting vessel) 10 is formed of a tubular case 11 and a pair of end plates 12a and 12b. An inlet 13 for raw water is formed in one end plate 12a and an outlet 15 for raw water is formed in the other end plate 12b. An outlet 14 for permeate is formed in the center of the other end plate 12b.

The spiral wound type membrane element 1 is accommodated in the tubular case 11 and both opening ends of the tubular case 11 are sealed with the end plates 12a and 12b. One end of the water collection pipe 2 is engaged with the permeate outlet 14 of the end plate 12b and an end cap 16 is attached to the other end. Piping 17 and a valve 18 are connected to the raw water outlet 15 of the end plate 12b.

When the spiral wound type membrane element 1 is run, raw water 51 is introduced into the pressure vessel 10 from the raw water inlet 13 of the pressure vessel 10. The raw water 51 enters the spaces between the envelope-like membranes 3 along the raw water spacers 4 from at least the periphery of the spiral wound type membrane element 1. In the example shown in FIG. 4, the raw water 51 enters the spaces between the envelope-like membranes 3 from the periphery and both ends of the spiral wound type membrane element 1. Permeate passed through the separation membranes 7 flows into the water collection pipe 2 along the permeate spacers 6. Then the permeate 52 is taken out from the permeate outlet 14 of the pressure vessel 10. Thus dead end filtration is performed.

In this case, since the raw water spacers 4 are so thin that contaminants such as suspended substances are at least caught on the periphery (in the example in FIG. 4, on the periphery and at both ends) of the membrane element 1, a cake layer of the contaminants at least forms on the periphery of the membrane element 1. Cake filtration is effected by the cake layer on at least the periphery of the membrane element 1, and membrane filtration is effected by the separation membranes 7 inside the membrane element 1.

The raw water may be partially extracted from the raw water outlet 15 by opening the valve 18. In this case, a flow of raw water can be formed in the periphery of the membrane element 1. Then it is possible to discharge part of contaminants in the raw water out of the pressure vessel 10 while suppressing sedimentation of the contaminants.

Figure 5:
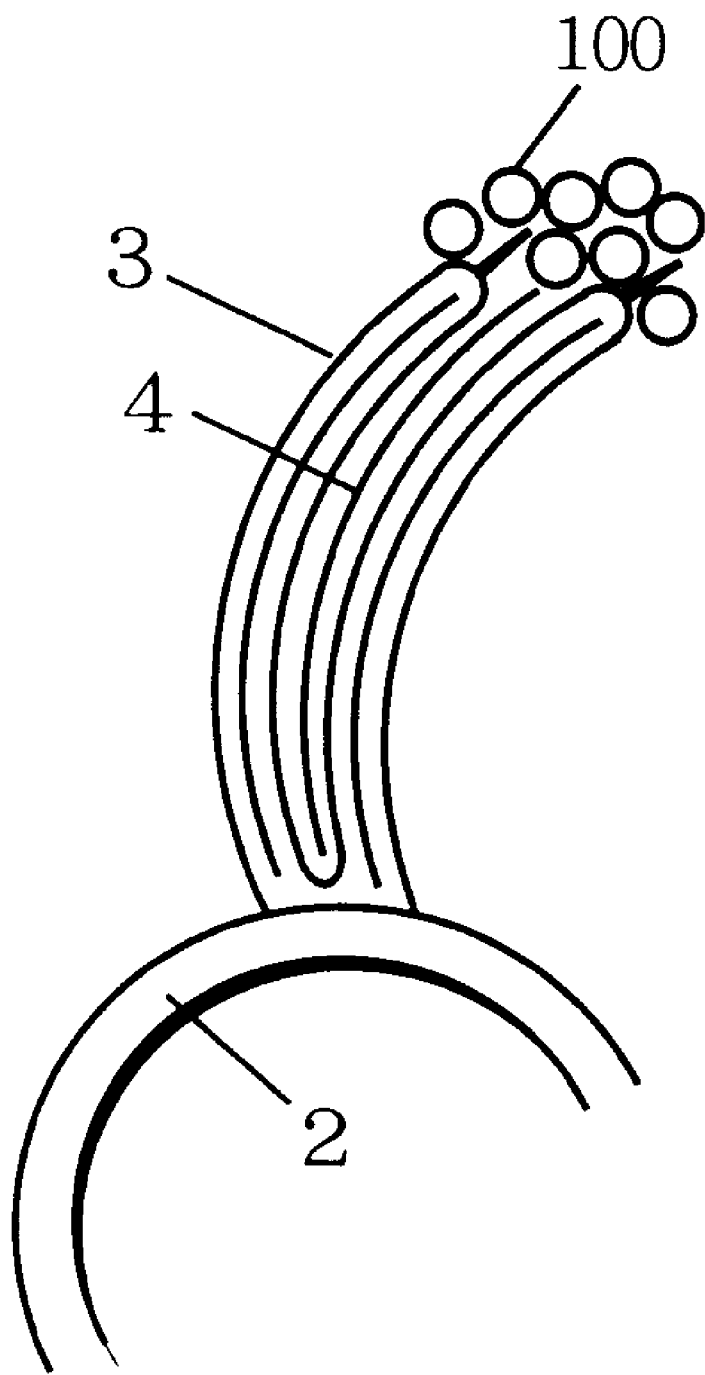
FIG. 5 is a cross section showing contaminants caught at the peripheral part of the spiral wound type membrane element of FIG. 1.
Figure 6:
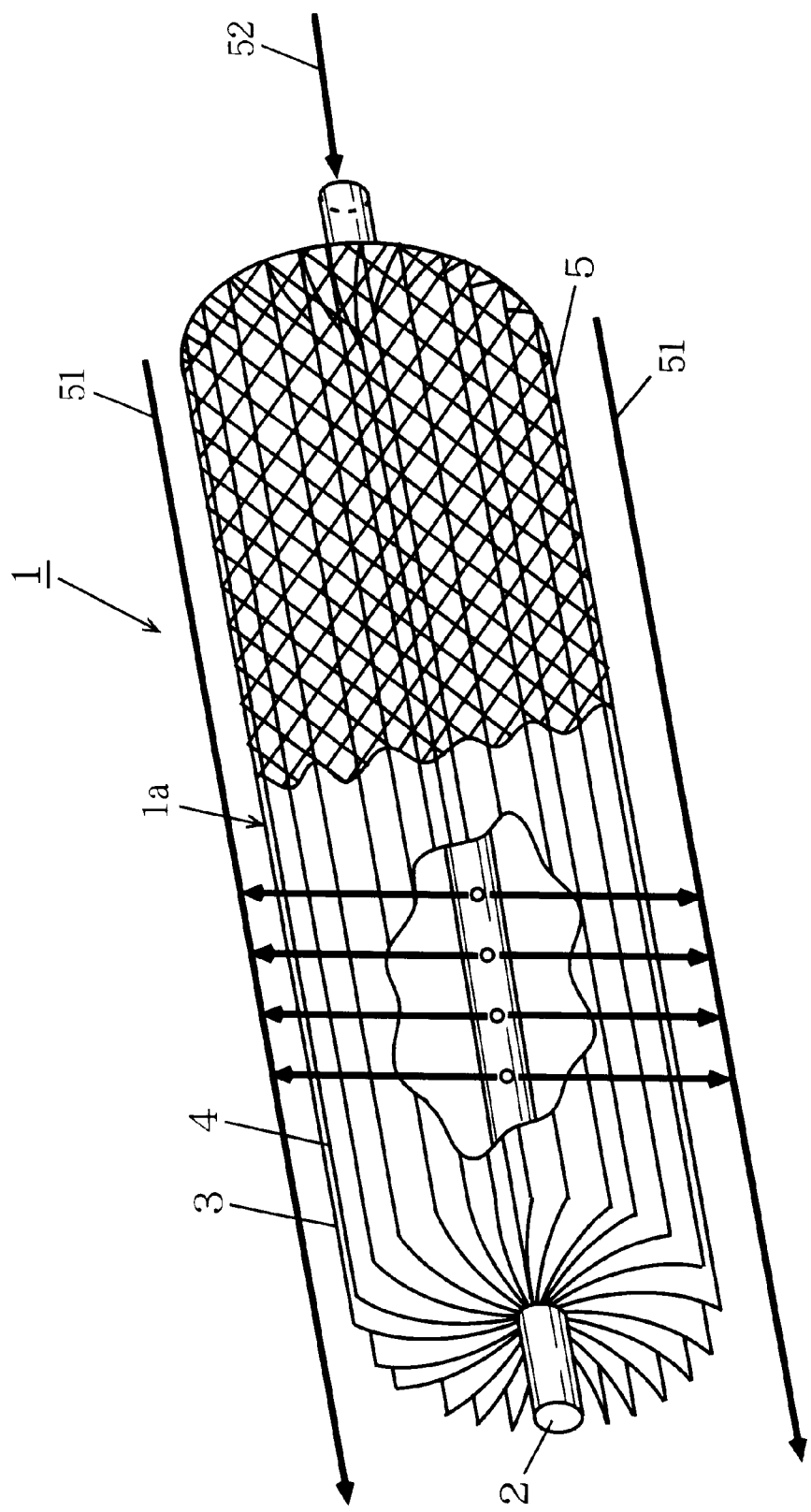
FIG. 6 is a partially cutaway perspective view showing back wash reverse filtration operation with the spiral wound type membrane element of FIG. 1.

After filtration is performed in a certain time period, back wash reverse filtration is performed with permeate from the permeate side. FIG. 6 is a partially cutaway perspective view showing back wash reverse filtration operation with the spiral wound type membrane element 1 in FIG. 1. In back wash reverse filtration, permeate 52 is introduced into the water collection pipe 2 from the permeate outlet 14 of FIG. 4. The permeate guided out from the peripheral surface of the water collection pipe 2 permeates through the envelope-like membranes 3 in the opposite direction to that in the filtration operation and flows along the raw water spacers 4 to the periphery at least. This, as shown in FIG. 5, causes at least the contaminants 100 caught on the periphery (in the example shown in FIG. 4, on the periphery and both ends) of the membrane element 1 to easily come off.

This process is followed by flushing wash with raw water. That is to say, the valve 18 is opened while supplying raw water 51 from the raw water inlet 13 of FIG. 4, so that the raw water flows in the axial direction along the periphery of the membrane element 1. This causes the contaminants remaining on the periphery of the membrane element 1 to come off from the membrane element 1, and the contaminants stripped off from the membrane element 1 are discharged out of the system through the raw water outlet 15 and the piping 17 in FIG. 4. As the result, the flux of permeate is largely recovered as compared with before the back wash reverse filtration.

According to the above-described washing method, contaminants caught by the membrane element 1 can be removed easily and certainly, which always maintains stable permeate flow rate.

Furthermore, in the spiral wound type membrane element 1 of this embodiment, filtration carried out in the above-described manner does not form a dead space S in the gap between the membrane element 1 and the pressure vessel 10. This prevents problems caused by propagation of various germs such as microorganisms, generation of a bad smell due to decomposition of organic matter, and decomposition of the separation membranes, thus providing high reliability.

Further, since pressures are applied to the membrane element 1 from all directions, the membrane element 1 is not deformed, which eliminates the necessity of using packing holders and a sheath. This reduces the parts cost and production cost.

Further, it is not necessary to use a large pump to supply raw water since dead end filtration is performed. This reduces the system cost.

Figure 7A:
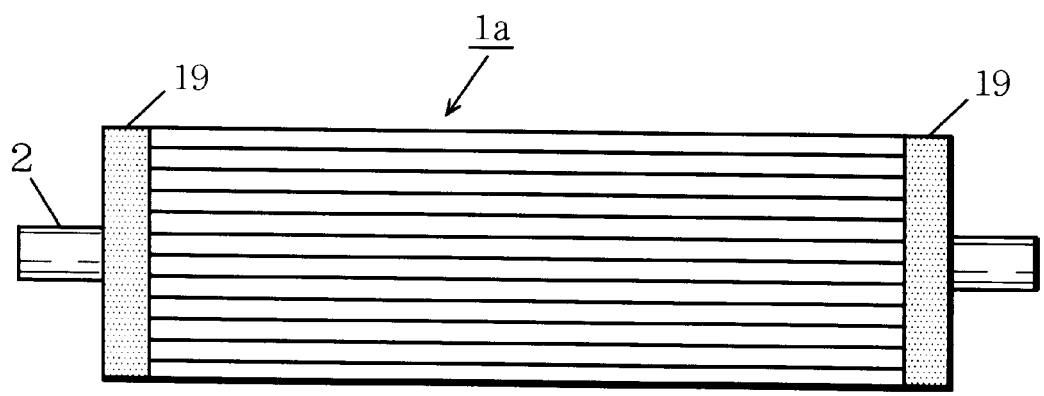
FIG. 7 is a front view showing spiral wound type membrane elements according to another embodiment of the present invention.
Figure 7B:
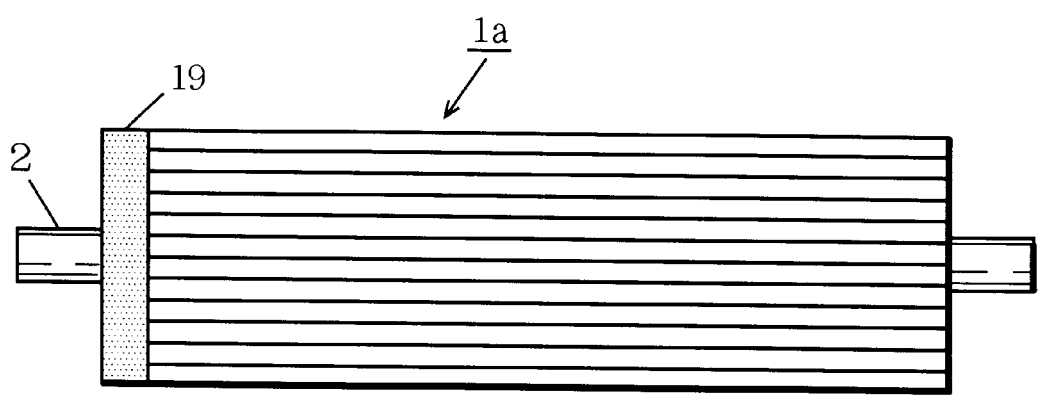
Figure 8:
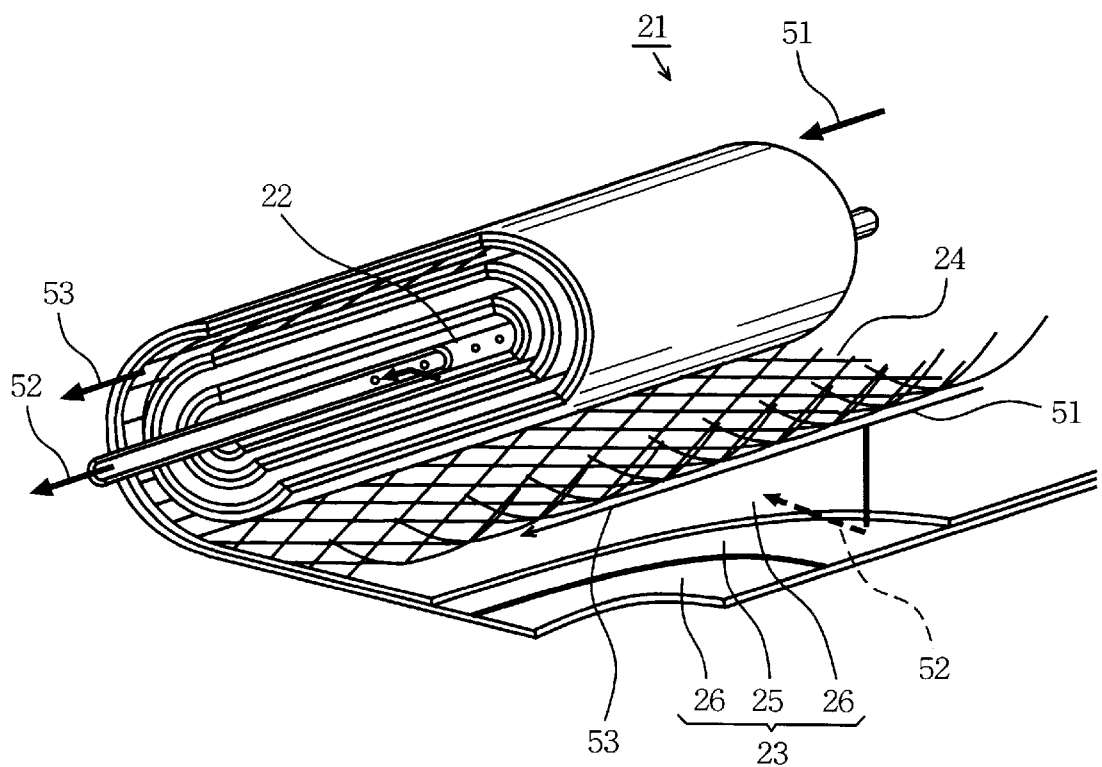
FIG. 8 is a partially cutaway perspective view showing a conventional spiral wound type membrane element.
Figure 9:
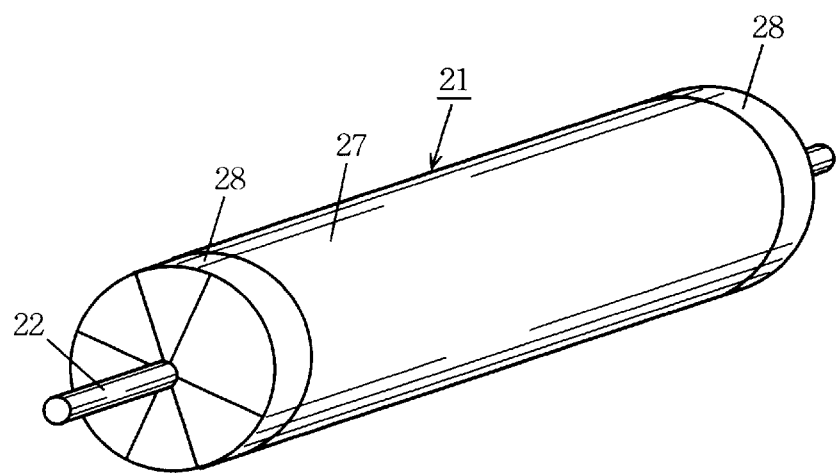
FIG. 9 is an external perspective view of the conventional spiral wound type membrane element.
Figure 10:
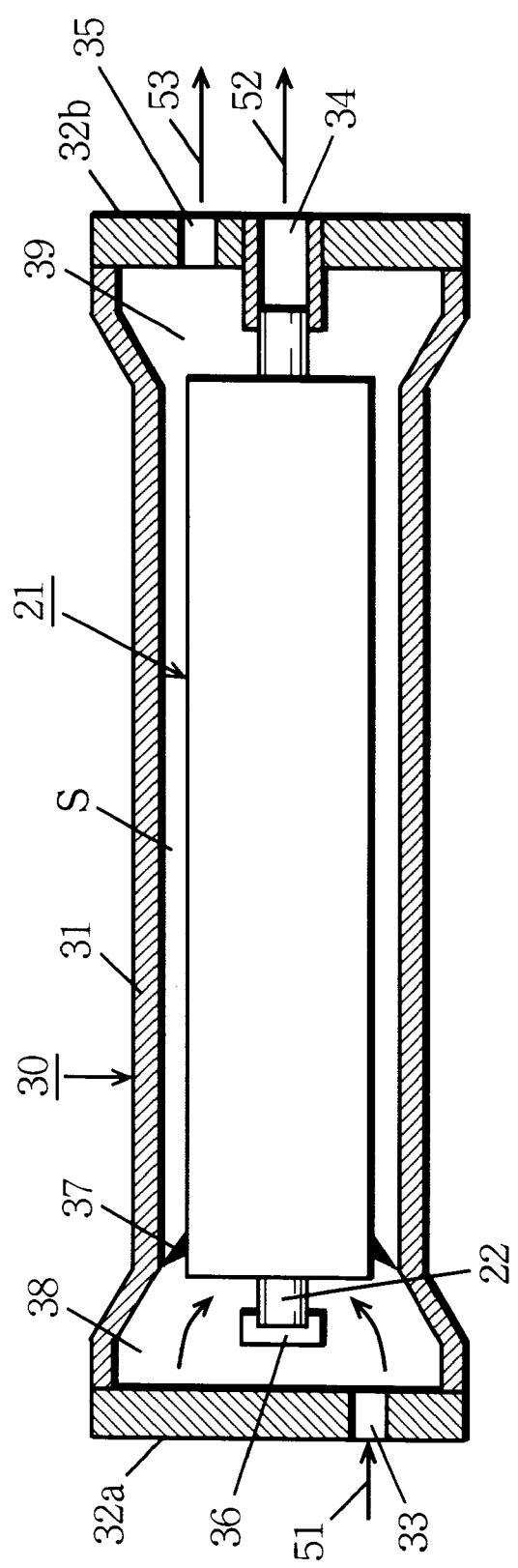
FIG. 10 is a cross section showing an example of a method of running the conventional spiral wound type membrane element.
Figure 11:
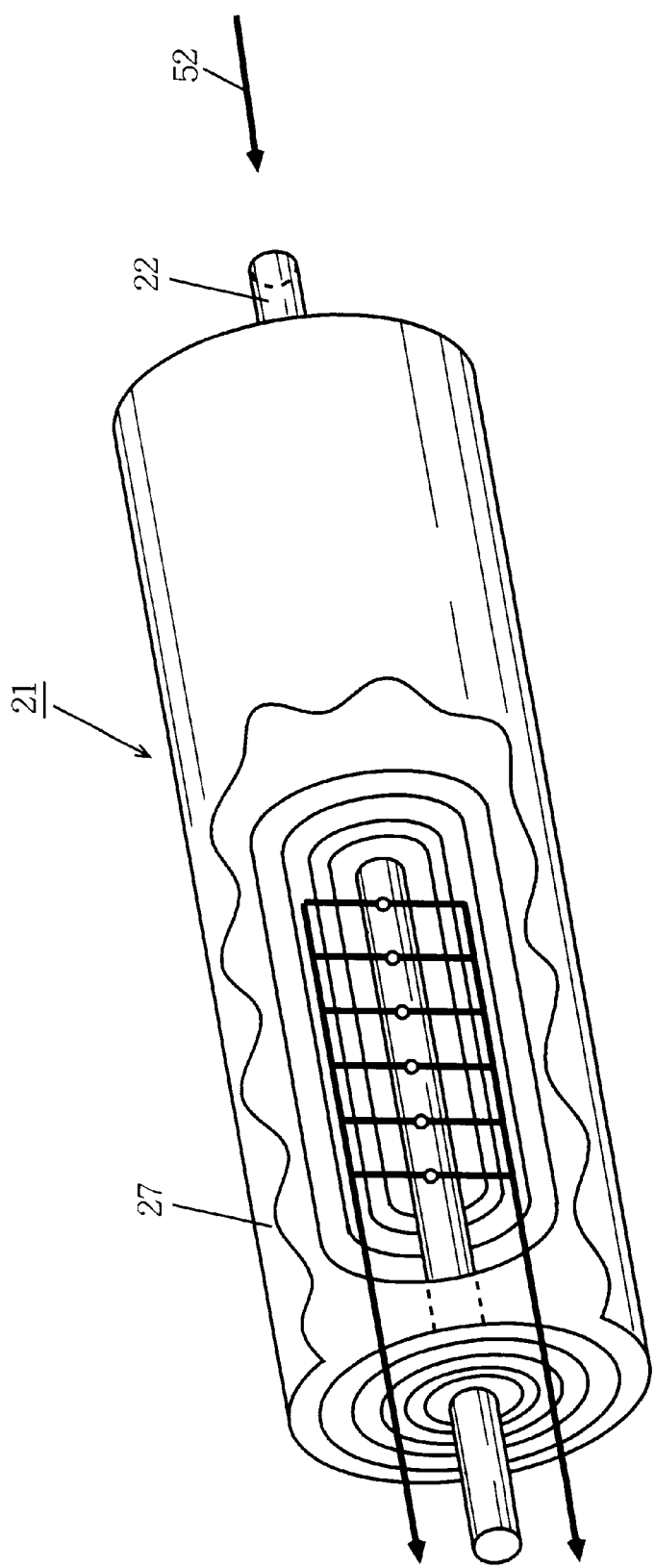
FIG. 11 is a partially cutaway perspective view showing back wash reverse filtration operation with the conventional spiral wound type membrane element.

FIG. 7 is a front view showing spiral wound type membrane elements according to another embodiment of the present invention. In FIG. 7, the peripheral passage forming member is not shown.

With the spiral wound type membrane element 1 of FIG. 7(*a*), both ends of the spiral membrane component 1*a* are sealed with resin layers 19. With the spiral wound type membrane element 1 shown in FIG. 7(*b*), the spiral membrane component 1*a* is sealed with a resin layer 19 on its one end.

The spiral wound type membrane elements 1 shown in FIGS. 7(*a*) and (*b*) require an increased number of process steps in fabrication, but they do not require a space for supply of raw water at both ends or at one end of the membrane elements 1. This allows size reduction of the pressure vessel, thus allowing size reduction of a spiral wound type membrane module formed by accommodating the membrane element 1 in a pressure vessel.

Further, when the end of the membrane element 1 sealed with the resin layer 19 is positioned on the side of the raw water inlet in the pressure vessel, it is possible to prevent dirt from attaching to the end of the membrane element 1 due to dynamic pressure of raw water when raw water is introduced.

While the invention has been described in detail, the foregoing description is in all aspects illustrative and not restrictive. It is understood that numerous other modifications and variations can be devised without departing from the scope of the invention.

What is claimed is:

1. A raw liquid filter system for dead-end filtration, comprising:
   a housing,
   a generally cylindrical spiral membrane component generally having an outer perimeter defined by two ends of the spiral membrane component and a membrane peripheral surface extending between the two ends, the spiral membrane being disposed in the housing to allow raw liquid to flow through a space provided between the outermost peripheral surface of the membrane and the housing,
   wherein said spiral membrane component comprises
   a perforated hollow pipe having at least one opening end for guiding permeate and having a peripheral surface,
   a plurality of envelope-like membranes each having an end disposed proximate to said peripheral surface of said perforated hollow pipe and each extending generally radially outwardly from said perforated hollow pipe, the ends of adjacent membranes forming a plurality of envelope openings open to said perforated hollow pipe, the envelope openings substantially surrounding the entire peripheral surface of the perforated hollow pipe, and
   raw liquid passage forming members interposed between said plurality of membranes, said raw liquid passage forming members being positioned to supply raw liquid, which enters the spiral membrane component through the membrane peripheral surface of the outer perimeter in a generally axial direction, which is generally perpendicular to the peripheral surface of the perforated hollow pipe, to the perforated hollow pipe.

2. The spiral wound type membrane element according to claim 1, wherein raw liquid is supplied from the peripheral side and both end sides of said spiral membrane component.

3. The spiral wound type membrane element according to claim 1, wherein one end of said spiral membrane component is sealed and raw liquid is supplied from the peripheral side and the other end side of said spiral membrane component.

4. The spiral wound type membrane element according to claim 1, wherein both ends of said spiral membrane component are sealed and raw liquid is supplied from the peripheral side of said spiral membrane component.

5. The spiral wound type membrane element according to claim 1, further comprising a peripheral passage forming member covering the periphery of said spiral membrane component, said peripheral passage forming member being adapted to supply raw liquid therethrough from the peripheral side of said spiral membrane component into said spiral membrane component.

6. The spiral wound type membrane element according to claim 5, wherein said peripheral passage forming member has a thickness of not less than 0.6 mm nor more than 30 mm.

7. The spiral wound type membrane element according to claim 5, wherein said peripheral passage forming member is a net formed of plastic, metal, rubber, or fiber.

8. The spiral wound type membrane element according to claim 1, wherein said raw liquid passage forming member has a thickness of not less than 0.1 mm nor more than 0.5 mm.

9. The spiral wound type membrane element according to claim 1, wherein each of said plurality of envelope-like membranes comprises two separation membranes and a permeate passage forming member interposed between said two separation membranes, wherein said two separation membranes are bonded together on three sides and the opening of said envelope-like membrane is attached to the peripheral surface of said perforated hollow pipe.

10. The spiral wound type membrane element according to claim 1, wherein each of said plurality of envelope-like membranes is formed of a low-pressure reverse osmosis membrane, an ultrafiltration membrane or a microfiltration membrane.

11. The spiral wound type membrane element according to claim 1, further comprising a pressure vessel in which said spiral membrane component is accommodated.

12. A method (A) for running a raw liquid filter system performing dead-end filtration, the system comprises: a housing, a generally cylindrical spiral membrane component generally having an outer perimeter defined by two ends of the spiral membrane component and a membrane peripheral surface extending between the two ends, the spiral membrane being disposed in the housing to allow raw liquid to flow through a space provided between the outermost peripheral surface of the membrane and the housing, wherein the spiral membrane component comprises: a perforated hollow pipe having at least one opening end for guiding permeate and having a peripheral surface, a plurality of envelope-like membranes each having an end disposed proximate to said peripheral surface of said perforated hollow pipe and each extending generally radially outwardly therefrom, the ends of adjacent membranes forming a plurality of envelope openings open to said perforated hollow pipe, the envelope openings substantially surrounding the entire peripheral surface of the perforated hollow pipe, and raw liquid passage forming members interposed between said plurality of envelope-like membranes, the raw liquid passage forming members being positioned to supply raw liquid, which enters the spiral membrane component through the membrane peripheral surface of the outer perimeter in a generally axial direction, which is generally perpendicular to the peripheral surface of the perforated hollow pipe, to the perforated hollow pipe, the method comprising the steps of, supplying raw liquid from at least the peripheral side of said spiral wound type membrane element to said membranes via said raw liquid passage forming members, guiding permeate generally radially inwardly through said membranes, and taking out permeate from at least one opening end of said perforated hollow pipe.

13. The spiral wound type membrane element running method (A) according to claim 12, wherein said step of supplying raw liquid comprises supplying raw liquid from the peripheral side and both end sides of said spiral wound type membrane element.

14. The spiral wound type membrane element running method (A) according to claim 12, wherein one end of said spiral wound type membrane element is sealed, and said step of supplying raw liquid comprises supplying raw liquid from the peripheral side and the other end side of said spiral wound type membrane element.

15. The spiral wound type membrane element running method (A) according to claim 12, wherein said spiral wound type membrane element is sealed at both ends, and said step of supplying raw liquid comprises supplying raw liquid from the peripheral side of said spiral wound type membrane element.

16. A method for washing a raw liquid filter system for performing dead-end filtration, the system comprises: a housing, a generally cylindrical spiral membrane component generally having an outer perimeter defined by two ends of the spiral membrane component and a membrane peripheral surface extending between the two ends, the spiral membrane being disposed in the housing to allow raw liquid to flow through a space provided between the outermost peripheral surface of the membrane and the housing, wherein the spiral membrane component comprises: a perforated hollow pipe having at least one opening end for guiding permeate and having a peripheral surface, a plurality of envelope-like membranes each having an end disposed proximate to said peripheral surface of said perforated hollow pipe and each extending generally radially outwardly from said perforated hollow pipe, the ends of adjacent membranes forming a plurality of envelope openings open to said perforated hollow pipe, the envelope openings substantially surrounding the entire peripheral surface of the perforated hollow pipe, and raw liquid passage forming members interposed between said plurality of envelope-like membranes, the raw liquid passage forming members being positioned to supply raw liquid, which enters the spiral membrane component through the membrane peripheral surface of the outer perimeter in a generally axial direction, which is generally perpendicular to the peripheral surface of the perforated hollow pipe, to the perforated hollow pipe, the method comprising the steps of, introducing a washing liquid from at least one opening end of said perforated hollow pipe, and discharging the washing liquid guided out from the peripheral surface of said perforated hollow pipe from at least the periphery of said spiral wound type membrane element.

17. The spiral wound type membrane element washing method according to claim 16, further comprising the step of causing washing liquid to flow in the axial direction along the periphery of said spiral wound type membrane element.

18. The spiral wound type membrane element washing method according to claim 16, wherein said washing liquid is permeate.

19. The spiral wound type membrane element washing method according to claim 16, wherein said step of discharging the washing liquid comprises discharging the washing liquid guided out from the peripheral surface of said perforated hollow pipe from the periphery and both ends of said spiral wound type membrane element.

20. The spiral wound type membrane element washing method according to claim 16, wherein said spiral wound type membrane element is sealed at its one end, and said step of discharging the washing liquid comprises discharging the washing liquid guided out from the peripheral surface of said perforated hollow pipe from the periphery and the other end of said spiral wound type membrane element.

21. The spiral wound type membrane element washing method according to claim 16, wherein said spiral wound type membrane element is sealed at both ends, and said step of discharging the washing liquid comprises discharging the washing liquid guided out from the peripheral surface of said perforated hollow pipe from the periphery of said spiral wound type membrane element.

22. A method for running a raw liquid filter system for performing dead-end filtration, the system comprises: a housing, a generally cylindrical spiral membrane component generally having an outer perimeter defined by two ends of the spiral membrane component and a membrane peripheral surface extending between the two ends, the spiral membrane being disposed in the housing to allow raw liquid to flow through a space provided between the outermost peripheral surface of the membrane and the housing, wherein the spiral membrane component comprises: a perforated hollow pipe having at least one opening end for guiding permeate and having a peripheral surface, a plurality of envelope-like membranes each having an end disposed proximate to said peripheral surface of said perforated hollow pipe and each extending generally radially outwardly from said perforated hollow pipe, the ends of adjacent membranes forming a plurality of envelope openings open to said perforated hollow pipe, the envelope openings substantially surrounding the entire peripheral surface of the perforated hollow pipe, and raw liquid passage forming members interposed between said plurality of envelope-like membranes, the raw liquid passage forming members being positioned to supply raw liquid, which enters the spiral membrane component through the membrane peripheral surface of the outer perimeter in a generally axial direction, which is generaslly perpendicular to the peripheral surface of the perforated hollow pipe, to the perforated hollow pipe, the method comprising the steps of, when running, supplying raw liquid from at least the peripheral side of said spiral wound type membrane element, and taking out permeate from at least one opening end of said perforated hollow pipe, and when washing, introducing permeate from at least one opening end of said perforated hollow pipe, and discharging the permeate guide out from the peripheral surface of said perforated hollow pipe from at least the periphery of said spiral wound type membrane element.

23. The spiral wound type membrane element running method (B) according to claim 22, further comprising the step of, when washing, causing washing liquid to flow in the axial direction along the periphery of said spiral wound type membrane element.

24. The spiral wound type membrane element running method (B) according to claim 22, wherein said step of supplying raw liquid comprises supplying raw liquid from the peripheral side and both end sides of said spiral wound type membrane element, and said step of discharging permeate comprises discharging the permeate guided out from the peripheral surface of said perforated hollow pipe from the periphery and both ends of said spiral wound type membrane element.

25. The spiral wound type membrane element running method (B) according to claim 22, wherein said spiral wound type membrane element is sealed at its one end, and said step of supplying raw liquid comprises supplying raw liquid from the peripheral side and the other end side of said spiral wound type membrane element, and said step of discharging permeate comprises discharging the permeate guided out from the peripheral surface of said perforated hollow pipe from the periphery and the other end of said spiral wound type membrane element.

26. The spiral wound type membrane element running method (B) according to claim 22, wherein said spiral wound type membrane element is sealed at both ends, and said step of supplying raw liquid comprises supplying raw liquid from the peripheral side of said spiral wound type membrane element, and said step of discharging permeate comprises discharging the permeate guided out from the peripheral surface of said perforated hollow pipe from the periphery of said spiral wound type membrane element.

27. A method for running a raw liquid filter system for dead-end filtration comprising: a housing, a generally cylindrical spiral membrane component generally having an outer perimeter defined by two ends of the spiral membrane component and a membrane peripheral surface extending between the two ends, the spiral membrane being disposed in the housing to allow raw liquid to flow through a space provided between the outermost peripheral surface of the membrane and the housing, wherein said spiral wound type membrane element comprises a perforated hollow pipe having at least one opening end for guiding permeate and having a peripheral surface, a plurality of envelope-like membranes each having an end disposed proximate to said peripheral surface of said perforated hollow pipe and each extending generally radially outwardly therefrom, the ends of adjacent membranes forming a plurality of envelope openings open to said perforated hollow pipe, the envelope openings substantially surrounding the entire peripheral surface of the perforated hollow pipe, and a plurality of raw liquid passage forming members interposed between said plurality of envelope-like membranes, said raw liquid passage forming members being positioned to supply raw liquid, which enters the spiral membrane component through the membrane peripheral surface of the outer perimeter in a generally axial direction, which is generally perpendicular to the peripheral surface of the perforated hollow pipe, to the perforated hollow pipe, the method comprising the steps of:

supplying raw liquid through said inlet of said vessel from at least the peripheral side of said spiral wound type membrane element to said membranes via said raw liquid passage forming members;

guiding permeate generally radially inwardly through said membranes; and taking out permeate from at least one opening end of said perforated hollow pipe.

28. A method for washing a spiral wound type membrane module, wherein said spiral wound type membrane module comprising: a housing, a generally cylindrical spiral membrane component generally having an outer perimeter defined by two ends of the spiral membrane component and a membrane peripheral surface extending between the two ends, the spiral membrane being disposed in the housing to allow raw liquid to flow through a space provided between the outermost peripheral surface of the membrane and the housing, wherein said spiral wound type membrane element comprises a perforated hollow pipe having at least one opening end for guiding permeate and having a peripheral surface, a plurality of envelope-like membranes each having an end disposed proximate to a peripheral surface of said perforated hollow pipe and each extending generally radially outwardly therefrom, the ends of adjacent membranes forming a plurality of envelope openings open to said perforated hollow pipe, the envelope openings substantially surrounding the entire peripheral surface of the perforated hollow pipe, and a plurality of raw liquid passage forming members interposed between said plurality of envelope-like membranes, said raw liquid passage forming members being positioned to supply raw liquid, which enters the spiral membrane component through the membrane peripheral surface of the outer perimeter in a generally axial direction, which is generally perpendicular to the peripheral surface of the perforated hollow pipe, to the perforated hollow pipe, the method comprising the steps of:

introducing a washing liquid from at least one opening end of said perforated hollow pipe;

discharging the washing liquid guided out from the peripheral surface of said perforated hollow pipe from at least the periphery of said spiral wound type membrane element; and taking out the washing liquid from said continuous space through said outlet of said vessel.

29. The method for washing the spiral wound type membrane module according to claim 28, further comprising the step of causing raw liquid to flow in the axial direction along the periphery of said spiral wound type membrane element from said inlet of said vessel to said outlet of said vessel through said continuous space.

* * * * *